United States Patent [19]

Matoba

[11] Patent Number: 5,293,477
[45] Date of Patent: Mar. 8, 1994

[54] OUTPUT APPARATUS

[75] Inventor: Toru Matoba, Tokyo, Japan

[73] Assignee: Canon Kabushiki Kaisha, Tokyo, Japan

[21] Appl. No.: 489,233

[22] Filed: Mar. 6, 1990

[30] Foreign Application Priority Data

Mar. 8, 1989 [JP] Japan .................................. 1-57313

[51] Int. Cl.⁵ .............................................. G06F 03/14
[52] U.S. Cl. .................................... 395/151; 395/150; 345/192
[58] Field of Search ............... 364/518, 519, 521, 522; 340/747, 750, 735, 743, 798, 799; 395/162, 164, 165, 166, 150, 151

[56] References Cited

U.S. PATENT DOCUMENTS

| 4,298,945 | 11/1981 | Kyte et al. | 364/523 |
| 4,682,198 | 7/1987 | Purdy et al. | 364/523 |
| 4,922,448 | 5/1990 | Kunieda et al. | 364/900 |
| 4,933,865 | 6/1990 | Yamamoto et al. | 364/518 |
| 4,949,281 | 8/1990 | Hillendbrand et al. | 364/518 |
| 4,959,801 | 9/1990 | Apley et al. | 364/518 |
| 4,962,465 | 10/1990 | Saito et al. | 364/518 |
| 4,987,550 | 1/1991 | Leonard et al. | 364/521 |

FOREIGN PATENT DOCUMENTS 0356104 2/1990 European Pat. Off. .

OTHER PUBLICATIONS

"Digital Fonts For Low-cost Typesetting Systems," Compcon Digest of Papers '86, Collins, Mar. 3, 1986, pp. 82-87.

Primary Examiner—Phu K. Nguyen
Attorney, Agent, or Firm—Fitzpatrick, Cella, Harper & Scinto

[57] ABSTRACT

An output method and apparatus for operating in a first processing method in which a character pattern of a bit map form can be selected and output or in a second processing method in which a character pattern can be made by arithmetic operating processes and output. The method includes the steps of receiving a command from an exterior equipment or a command from a switch to indicate which one of the two processing methods is to be selected, and selecting either one of the two processing methods in accordance with the command received from either the exterior equipment or the switch, wherein the character pattern selected and output in the first processing method and the character pattern made and output in the second processing method represent the same pattern.

60 Claims, 5 Drawing Sheets

OUTPUT APPARATUS

BACKGROUND OF THE INVENTION

1. Field of the Invention

The present invention relates to an output apparatus for outputting by using a character pattern of a bit map form and a character pattern of other form.

2. Related Background Art

Hitherto, there has been known an output apparatus for outputting a relevant character pattern which has previously been recorded in a medium such as a ROM or the like in a bit map form in accordance with a command which was received by a host computer or the like. (Hereinafter, such a style is called a "bit map system".)

Or, there has also been known an output apparatus in which a relevant character pattern is newly formed in a bit map form in the apparatus on the basis of design information (for instance, vector font data, stroke font data, etc.) of the character pattern and is output in accordance with a command which was received from a host computer or the like. (Hereinafter, such a style is called a "scaling system".)

Character pattern outputs according to the above two systems have the following advantages, respectively.

First, in the "bit map system" in which character patterns of the bit map form are previously prepared, by merely transferring the pattern which has already been formed to an output area, the character pattern is output. Thus, the processes are simple, the processing speed is also high, and it is sufficient to provide a small memory area.

On the other hand, in the case of the "scaling system" to newly form a character pattern from a bit map from the design information, since the design information itself is formed in a relative position information form, a change in size by setting a reducing/enlarging magnification and a modification of a pattern by setting the coordinate system can be easily executed from one pattern information and it is sufficient that an amount of data itself of the pattern which is prepared is also smaller than the bit map.

In the above two different functions, the former "bit map system" is simpler and can be more easily used. Therefore, the "bit map system" has already been put into practical use from the initial stage of the development of the output apparatus. In recent years, the latter "scaling system" has been tried.

However, the above two systems also have the following drawbacks.

First, in the "bit map system", since all of the character patterns which are preliminarily used must be prepared, in the case of outputting character patterns of different sizes and designs, a large amount of character pattern designs of the bit map as many as only the number of kinds of character patterns which are used need to be prepared in a memory such as a ROM or the like. For instance, even in the case of the character patterns of the same design, if their sizes differ by merely one level, the bit map patterns corresponding to those character patterns must be prepared as different character patterns in the memory.

If the character pattern of the relevant size does not exist, an accurate output as the user desires cannot be derived.

On the other hand, a large character pattern needs a memory area as large as the character pattern. Ordinarily, for the character patterns, since a set of a plurality of character patterns such as alphabetic characters, numerals, or the like are handled as a unit, as the character pattern increases, a necessary memory capacity of the whole memory increases.

From the above reasons, in the "bit map system", there is inherently a limitation in the number of kinds of character patterns which can be used by a single apparatus.

In the case of the "scaling system", upon outputting, a character pattern of a bit map is newly formed and its arranging process inevitably becomes complicated. It takes a long time to arrange the character pattern and efficiency deteriorates.

When actually outputting, in general, the character pattern is only then converted into a bit map form and output. Therefore, a large memory area is needed although it is temporarily used. As mentioned above, as compared with the method whereby the character patterns are prepared in a bit map form from the beginning, a complicated and large construction of the apparatus is needed and the processing speed is also slow.

The output apparatus using the above two systems has been put into practical use in recent years. The formation of the character pattern by the "scaling system" is provided in addition to the "bit map system" which has also been put into practical use.

The above two systems have the advantages and disadvantages as mentioned above and the "scaling system" as a new technique is not always excellent.

For instance, there is considered a case where the size of memory area which can be used is so small that the character pattern cannot be preferably output by the "scaling system". FIG. 4 shows an example in the case where the character patterns were generated by the "scaling system". In the diagram, reference numeral 41 denotes the result of the output in the case where character patterns were generated by variably changing the size. At this time, if the memory area lacks, as shown by reference numeral 42 in the diagram, a state in which it is impossible to form character patterns and no character pattern entered can then be output.

In such a case, character patterns can normally be output by using the "bit map system".

On the other hand, although the "scaling system" is effective in the case where a character pattern of a size or a design which does not certainly exist is formed and used, if the character pattern which is used already exists in a bit map form, the use of the "bit map system" is obviously effective from viewpoints of the speed, use efficiency of the memory, and the like. It is not always necessary to use the "scaling system".

Or, in the case where the output apparatus at the initial stage is mainly designed in the "bit map system" as mentioned above and the application software formed on the basis of the "bit map system" which have already been accumulated at that era are used, there is a possibility that the output result differs from that which has been output so far because of the difference in compatibility with the new system.

Further, in the case of the output for what is called an output confirmation such that a high outputting speed is required rather than the accuracy of the formation of the character patterns, the "bit map system" is more effective than the process based on the "scaling system"

in which the processing speed is slow although the output accuracy is higher.

However, in such a conventional output apparatus, significance is paid to the "scaling system" as a new technique and such an output apparatus is not designed by sufficiently considering the effective use of the advantages and disadvantages of both of the "bit map system" and the "scaling system". Due to an idea to execute the processes by always using the "scaling system", the users of the output apparatuses must execute the memory expansion, which is unnecessary in the conventional output form, and must use the vain processing time and must correct or abandon the data or application software which have been accumulated so far.

As mentioned above, the conventional output apparatus does not have means for properly and selectively using either the "bit map system" or the "scaling system" as necessary. Therefore, the advantages of those two systems cannot be sufficiently used by the selective use. There is a problem such that a burden on the user increases.

SUMMARY OF THE INVENTION

It is an object of the present invention to provide an output apparatus in which either one of the "scaling system" and the "bit map system" is preliminarily designated as an output system, while the output system can be properly changed in accordance with a memory capacity, an output character size, or the like.

Another object of the invention is to provide means for sufficiently selectively using the "bit map system" and the "scaling system" in accordance with the necessity.

Still another object of the invention is to realize an effective character pattern output having efficiency in which the advantages of the above two systems can be sufficiently used by the selective use.

Further, another object of the invention is to provide a character output apparatus to realize a character pattern generating process in which a character pattern generating method can be previously designated and can be further designated in accordance with a situation and a character pattern can be generated and output by the designated method.

In consideration of the above points, another object of the invention is to provide an output apparatus in which a character pattern of a bit map form can be selected and output or a character pattern can be formed and output by arithmetic operating processes, comprising: receiving means for receiving a command to indicate which one of the above two character pattern generating methods is used; discriminating means for discriminating a memory capacity in the apparatus in the case of outputting a certain character and a size of character to be output; and selecting means for selecting on the basis of the results of the discrimination of the discriminating means either one of the generating methods in accordance with the command which is received by the receiving means or irrespective of the command.

DETAILED DESCRIPTION OF THE PREFERRED EMBODIMENTS

An embodiment of the present invention will be described in detail hereinbelow with reference to the drawings. An apparatus shown in the embodiment may be apparatuses which are connected to a host computer or a single apparatus.

Figure 1:
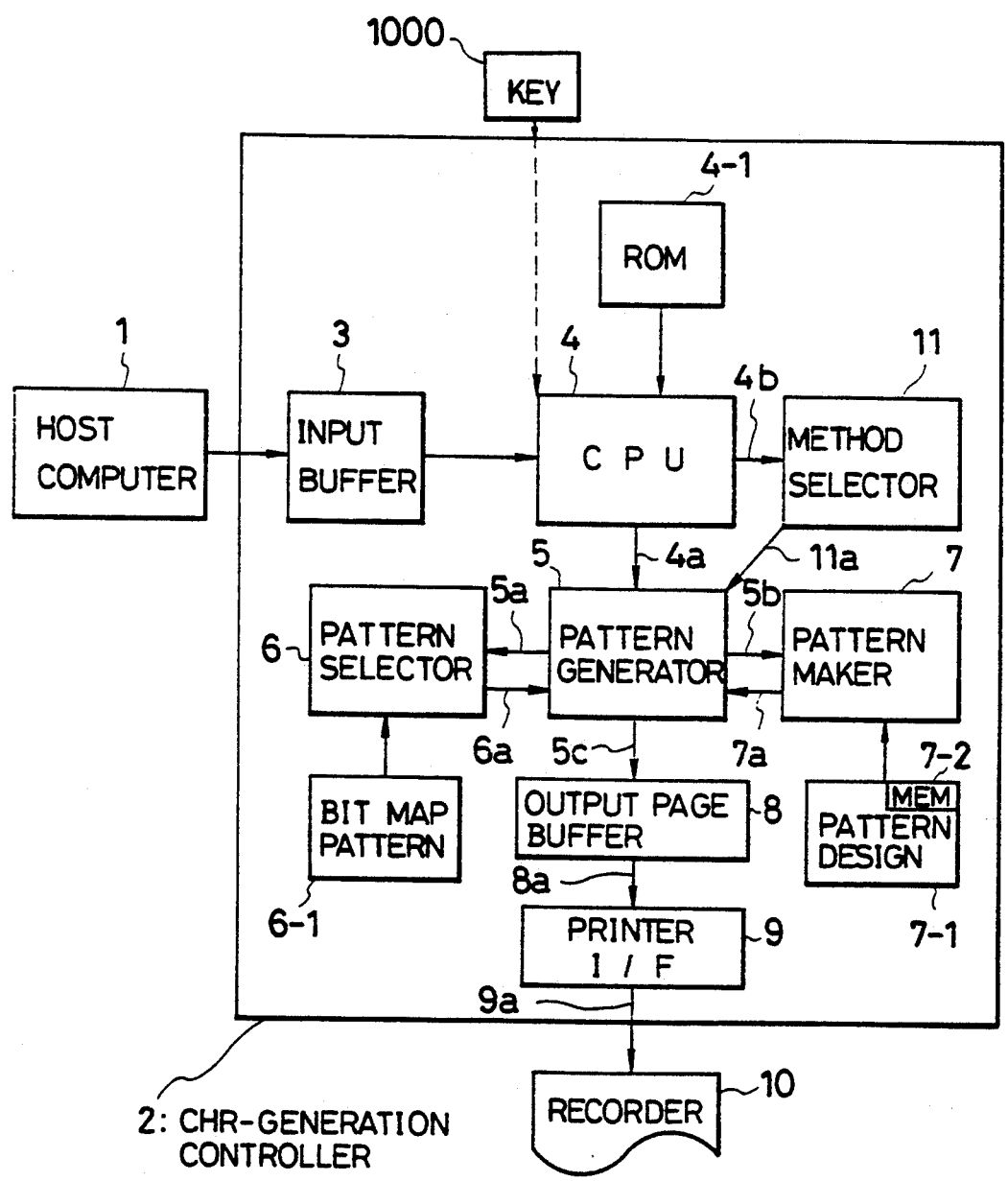
FIG. 1 is a block diagram showing a construction of a page printer according to an embodiment of the present invention.

FIG. 1 is a block diagram showing a construction of a page printer as an embodiment of the invention.

Reference numeral 1 denotes a host computer. The host computer 1 generates data (hereinafter, simply referred to as character data) of characters, numerals, symbols, or the like and various control commands and also generates a character pattern generation form instructing command to designate a character pattern generating method which is used for printing. Those character data and commands are input to a character-generation controller 2 as a main section of the output apparatus according to the embodiment.

In the character-generation controller 2, reference numeral 3 denotes an input buffer to temporarily store the character data, various control data, character pattern generation form instructing command, etc. which are input from the host computer 1. Reference numeral 4 indicates a CPU which is constructed by, for instance, a general microprocessor or the like. In accordance with programs or the like corresponding to a processing procedure shown in FIG. 3 and stored in an ROM 4-1, the CPU 4 analyzes the input data accumulated in the input buffer 3 and executes the relevant process. In the case where the input data is character data, the CPU 4 generates a character code 4a. If the character pattern generation form designating instruction is input, the CPU 4 generates a character pattern generation form instructing command 4b.

Reference numeral 5 indicates a character pattern generator for generating a relevant character pattern 5c in accordance with the character code 4a which was received from the CPU 4. To generate the character pattern 5c, two processing flows are executed by the character generating method at that time point.

First, in the case of the "bit map system", the character pattern generator 5 sends a character pattern selecting command 5a to a character pattern selector 6 so as to search the character pattern corresponding to the character code 4a. In response to the command 5a, the character pattern selector 6 selects the character pattern designated by the character pattern selecting command 5a from among bit map character patterns 6-1 which have been prepared in a bit map form in an ROM, an RAM, or the like. Then, the selector 6 returns the selected character pattern as a bit map character pattern 6a to the character pattern generator 5. Character patterns of the sizes until, for instance, 28.8 points are prepared as the bit map character patterns 6-1. The bit map character pattern 6a is sent to an output page buffer 8.

On the other hand, in the case of the "scaling system", the character pattern generator 5 sends a character pattern forming command 5b to a character pattern maker 7 so as to make the character pattern corresponding to the character code 4a. The character pattern maker 7 which receives the command 5b has a memory area to develop the character pattern of the "scaling system" into the bit map character pattern. The character pattern maker 7 forms the character pattern of the bit map form into a memory area 7-2 on the basis of the design information of the character pattern designated by the character pattern forming command 5b existing in character pattern design information 7-1 which has been prepared as a form of the design information of the character pattern in a ROM, RAM, or the like. Then, the character pattern maker 7 returns the character pattern which was formed as mentioned above as a bit map character pattern 7a to the character pattern generator 5.

Reference numeral 8 denotes the output page buffer. The character pattern 5c which was received from the character pattern generator 5 is temporarily stored in the output page buffer 8. A dot image 8a stored is sent to a printer interface (I/F) 9. The printer I/F 9 sends a video signal 9a corresponding to the dot image stored in the output page buffer 8 to a recorder 10 which is constructed by, for instance, a laser beam printer.

Reference numeral 11 denotes a character generating method selector according to the embodiment. In accordance with the character generating method selecting command 4b which was received from the CPU 4, the character generating method selector 11 selects either a method of generating a character pattern by the "bit map system" by the character pattern generator 5 or a method of making the character pattern by the "scaling system" and generates the selected character generating method as character generating method instructing command 11a. The character generating method instructing command 11a is input to the character pattern generator 5. It is determined that the character pattern generating process is executed by which one of the above two systems when the character code 4a is sent. For the ROM and RAM which have been mentioned with respect to the bit map character patterns 6-1 and character pattern design information 7-1, both of the ROM and the RAM can commonly store those patterns and information. The memory area 7-2 for development of the character pattern design information 7-1 may be also provided as a part of the RAM. On the other hand, the same ROM as the ROM 4-1 or a different ROM can be used as the above ROM.

Figure 2:
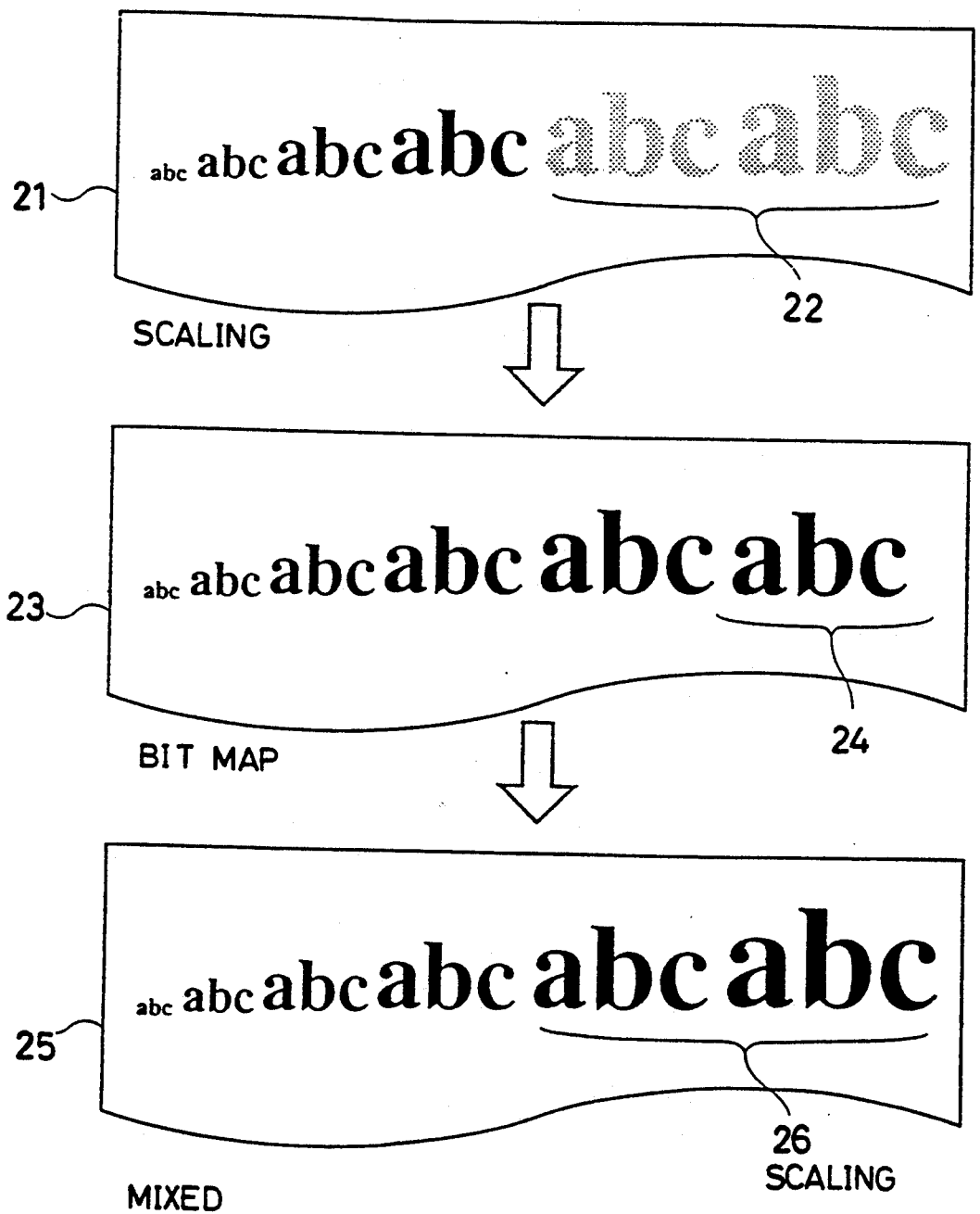
FIG. 2 is a plan view showing character pattern generating processes which were improved by the embodiment.

FIG. 2 shows states of the character pattern generation according to the embodiment. In the diagram, reference numeral 21 denotes character patterns formed by the "scaling system" and expresses a state in which the size of pattern is freely changed in accordance with commands from the host computer 1 and the character patterns of various sizes are printed. However, as shown by 22 in the diagram, in the case of the "scaling system", since a large memory area is needed, the number of character patterns which can be formed is limited due to circumstances of the memory (memory area 7-2 mentioned above) at the time point. The character patterns of a larger number than the limit value cannot be amde nor output. Not only the output patterns lack but also the control itself stops. Or, in the case where an output time is long and a large amount of data is output or the like, the processing speed is too slow and such a system cannot be used.

therefore, the "scaling system" is abondoned and the character pattern generation form instructing command is set to the "bit map system" so as to excute the character pattern generating process by the "bit map system" and the similar data is printed, so that character patterns are printed as shown by 23 in the diagram. For instance, if the output size is set to a size of 28.8 point or less which has already been provided as bit maps, the data in the bit map form can be immediately output in place of the data in the scaling form.

By designating the "bit map system", even if the capacity of the memory area 7-2 of the apparatus lacks, the memory itself is unnecessary, so that the characterr patterns can be printed without any problem. On the other hand, the processing speed is also high and even a large amount of output data can be processed in a short time.

The "bit map system" also obviously has a problem. For instance, as shown by 24 in the diagram, if the character pattern of the relevant size or design does not exist, the character ppattern of a size near the inherent size substituted. Consequently, there is also a case where the accurate output as in the case of using the "scaling system" cannot be obtained. In such a case, it is sufficient to generate the character patterns in the "scaling system" with respect to only the character patterns which cannot be supplied by the "bit map system". Reference numeral 25 in the diagram shows the result of the printing in such a case. There is a case where although it is impossible to execute the whole output by the "scaling system" in the memory, it is possible to perform the output with respect to only the necessary portion by the "scaling system". In the case of executing the scaling process for such a necessary part, the processing speed is not so slow.

Although the above embodiment has been described with respect to the example of the size of character pattern, the same shall also apply to the design, making method, or the like of character pattern.

Figure 3:
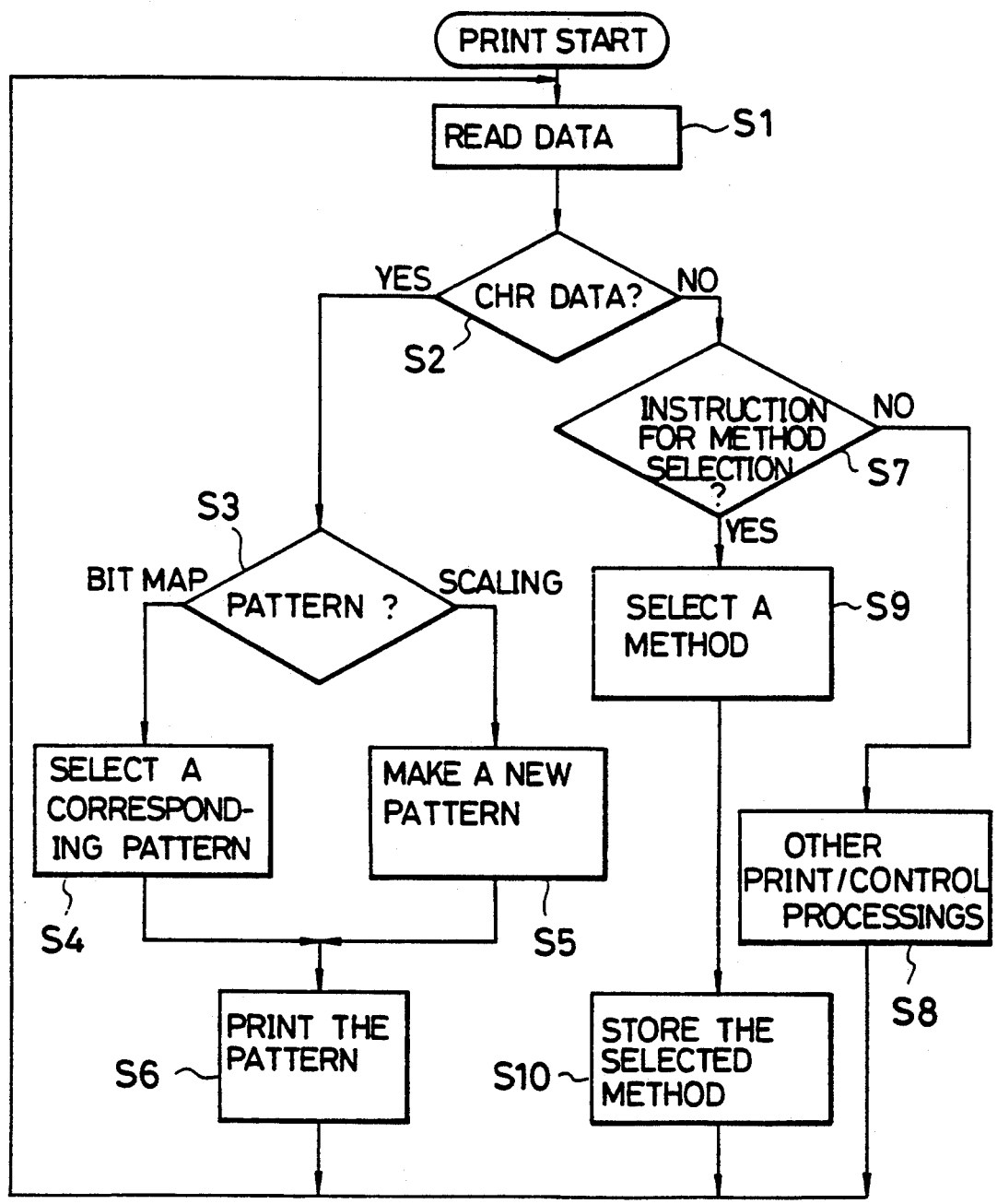
FIG. 3 is a flowchart showing the operation of the printer in the embodiment.
Figure 4:
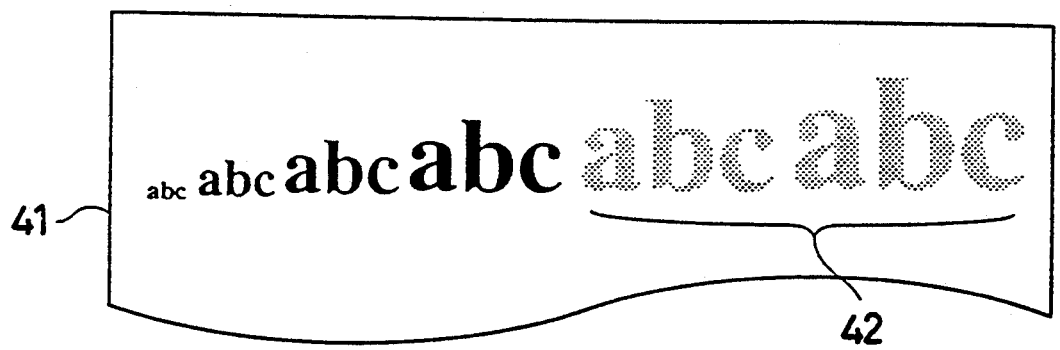
FIG. 4 is a plan view showing an example of conventional character pattern generating processes.

FIG. 3 shows an example of a procedure for character pattern making processes according to the above embodiment. Reference numerals (S1) to (S10) denote step numbers.

When the printing is started, data codes are transmitted by the host computer 1 and the input data is read one unit by one by the CPU 4 (S1). A check is made to see if the input data is character data or not (S2). In the case of the character data, a check is made to see if the character pattern is generated by the "bit map system" or the "scaling system" in accordance with the character pattern generating method designated at that time point (S3). If the "bit map system" is designated, the relevant bit map character pattern is selected (S4). If the "scaling system" has been designated, a character pattern of a bit map is newly formed on the basis of the design information of the relevant character pattern (S5). The character pattern is printed (S6). If the input data is not character data, a check is made to see if the input data is a command to designate the character pattern generating method or not (S7). If NO, the other printing/control process is executed (S8). If the input data is the command to designate the character pattern generating method, the subsequent character pattern generating method is selected by the character generating method selector 11 according to the embodiment (S9). The character pattern generating method designated by the selection is stored into the RAM by using a flag or the like so as to be used in the subsequent character pattern generating processes (S10). The generating method stored is used upon generation of the character patterns mentioned in step (S3) above.

By the above processes, when the operator executes the operations to generate and output the character patterns, the best character pattern generating method at that time point can be selected and the character patterns can be output in accordance with the output content of the apparatus and the performance and construction of the apparatus. Thus, the optimum pattern formation which cannot be realized when each of the "bit map system" and the "scaling system" is solely used can be realized. A desired character pattern output of the user can be accomplished.

Although the embodiment has been described with respect to the case where the present invention was applied to a page printer, the invention is not limited to the above case but can be also easily applied to an output apparatus such as printer, CRT, or the like of other system.

The character pattern generating method can also be switched and selected by using a switch (1000 in FIG. 1) or the like by the user. In this case, the CPU 4 for extracting data from the key section 1000 is used as receiving means.

Figure 5:
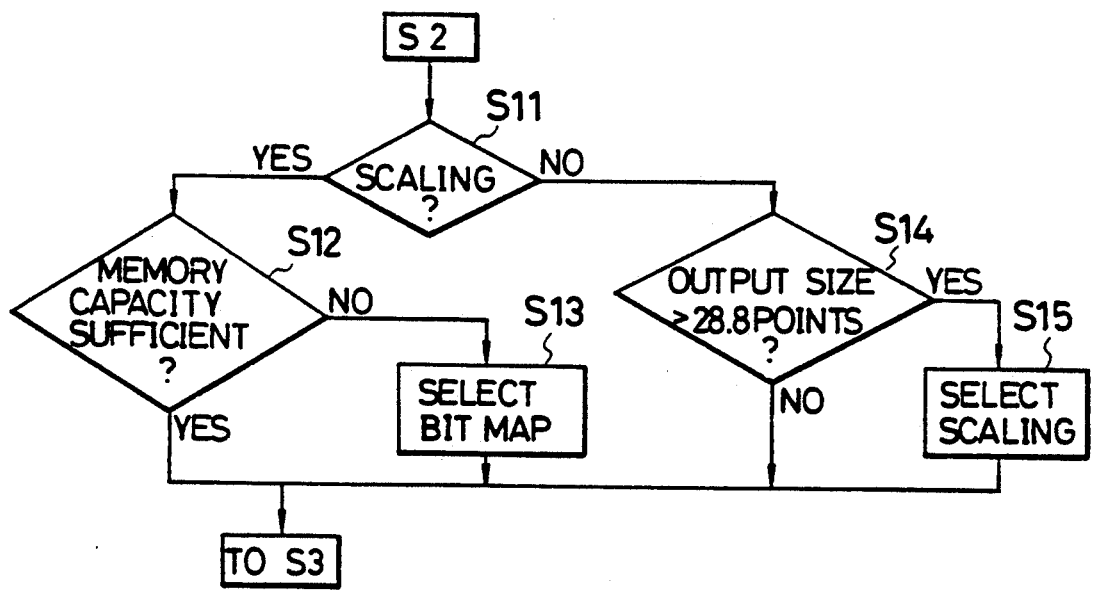
FIG. 5 is a flowchart for changing a form.

FIG. 5 shows a flowchart for discriminating the state of the memory area 7-2. The processes shown in FIG. 5 can be also provided, for instance, between steps S2 and S3 in FIG. 3. If data has been read in S1 in FIG. 3, a check is first made in S11 in FIG. 5 to see if the character generation is executed by the "scaling system" or the "bit map system". On the other hand, it is now assumed that when the power source is turned on, either one of the systems is forcedly set. However, as mentioned above, either one of the systems can also be designated from the outside as mentioned above. In the case of the "scaling system", step S12 follows and a check is made to see if the capacity of the memory area 7-2 is sufficient or not. If YES, since the scaling system is proper for the data to be subsequently output, the processing routine advances, to step S3. If NO in S12, the "bit map system" is selected in S13 in order to use the characters to be subsequently output as data in the bit map form. If NO in S11, that is, if the "bit map system" is selected, S14 follows and a check is made to see if the output size is set to, for instance, 28.8 point or not. If YES, the character pattern of the bit map form is read out but cannot be output as it is. Therefore, the processing routine advances to S15 and the "scaling system" is selected. Then, S3 follows. Due to this, although the generating method of the character to be output has previously been designated to either the "scaling system" or the "bit map system", one of the systems can be properly changed in accordance with the memory capacity or the size of output character.

As described above, according to the invention, the character pattern is made and output in accordance with the designated making form. Therefore, the optimum character pattern making processes can be executed in accordance with the requirements of the user such as compatibility with the conventional outputs, avoidance of the unnecessary scaling process, and the like. A character pattern formation which the user desires can be realized.

As mentioned in detail above, it is possible to provide an output apparatus in which a character pattern of a bit map form can be selected and output or a character pattern can be formed and output by arithmetic operating processes, comprising: receiving means for receiving a command from an outside to indicate which one of the character pattern generating methods is used; discriminating means for discriminating a memory capacity in the apparatus in the case of outputting a certain character and a size of character to be output; and selecting means for selecting on the basis of the results of the discrimination of the discriminating means either one of the character pattern generating methods in accordance with the command from the outside which is received by the receiving means or irrespective of the command from the outside.

What is claimed is:

1. An output apparatus operable in a first processing method in which a character pattern of a bit map form can be selected and output or in a second processing method in which a character pattern can be made by arithmetic operating processes and output, said apparatus comprising:
   receiving means for receiving a command from an exterior equipment to indicate which one of the two processing methods is to be selected;
   discriminating means for discriminating a memory capacity in said apparatus in the case of outputting a certain character; and
   selecting means which can select either one of the two processing methods on the basis of the results of the discrimination of said discriminating means irrespective of the received command,
   wherein the character pattern selected and output in the first processing method and the character pattern made and output in the second processing method represent the same pattern.

2. An apparatus according to claim 1, wherein said selecting means may select either one of the two processing methods from any character pattern of a character pattern train to be output.

3. An output apparatus operably in a first processing method in which a character pattern of a bit map form can be selected and output or in a second processing method in which a character pattern can be made by arithmetic operating processes and output, said apparatus comprising:
   receiving means for receiving a command from an exterior equipment to indicate which one of the two processing methods is to be selected;
   discriminating means for discriminating a size of a certain character in the case of outputting the character; and
   selecting means which can select either one of the two processing methods on the basis of the results of the discrimination of said discriminating means irrespective of the received command,
   wherein the character pattern selected and output in the first processing method and the character pattern made and output in the second processing method represent the same pattern.

4. An apparatus according to claim 3, wherein said selecting means may select either one of the two processing methods from any character pattern of a character pattern train to be output.

5. An output apparatus operable in a first processing method in which a character pattern of a bit map form can be selected and output or in a second processing method in which a character pattern can be made by arithmetic operating processes and output, said apparatus comprising:
   receiving means for receiving a command via a switch to indicate which one of the two processing methods is to be selected;
   discriminating means for discriminating a memory capacity in said apparatus in the case of outputting a certain character; and selecting means which can select either one of the two processing methods on the basis of the results of the discrimination of said discriminating means irrespective of the received command, wherein the character pattern selected and output in the first processing method and the character pattern made and output in the second processing method represent the same pattern.

6. An apparatus according to claim 5, wherein said selecting means may select either one of the two processing methods from any character pattern of a character pattern train to be output.

7. An apparatus according to claim 5, wherein the switch may be manually operated.

8. An output apparatus operable in a first processing method in which a character pattern of a bit map form can be selected and output or in a second processing method in which a character pattern can be made by arithmetic operating processes and output, said apparatus comprising:

receiving means for receiving a command via a switch to indicate which one of the two processing methods is to be selected;

discriminating means for discriminating the size of a certain character in the case of outputting the character; and selecting means which can select either one of the two processing methods on the basis of the results of the discrimination of said discriminating means irrespective of the received command, wherein the character pattern selected and output in the first processing method and the character pattern made and output in the second processing method represent the same pattern.

9. An apparatus according to claim 8, wherein said selecting means may select either one of the two processing methods from any character pattern of a character pattern train to be output.

10. An apparatus according to claim 8, wherein the switch may be manually operated.

11. An output apparatus operable in a first processing method in which a character pattern of a bit map form can be selected and output or in a second processing method in which a character pattern can be made by arithmetic operating processes and output, said apparatus comprising:

said discriminating means for discriminating a memory capacity in said apparatus in the case of outputting a certain character; and selecting means for selecting the second processing method when said discriminating means discriminates that the memory capacity is sufficient.

12. An apparatus according to claim 11, wherein said selecting means may select the second processing method from any character pattern of a character pattern train to be output.

13. An output apparatus operable in a first processing method in which a character pattern of a bit map form can be selected and output or in a second processing method in which a character pattern can be made by arithmetic operating processes and output, said apparatus comprising:

discriminating means for discriminating a memory capacity in said apparatus in the case of outputting a certain character; and selecting means for selecting the first processing method when said discriminating means discriminates that the memory capacity is insufficient.

14. An apparatus according to claim 13, wherein said selecting means may select the first processing method from any character pattern of a character pattern train to be output.

15. An output apparatus operable in a first processing method in which a character pattern of a bit map form can be selected and output or in a second processing method in which a character pattern can be made by arithmetic operating processes and output, said apparatus comprising:

receiving means for receiving a command from an exterior equipment to indicate that the first processing method is to be selected;

discriminating means for discriminating the size of a certain character in the case of outputting the character; and selecting means for selecting the first processing method in response to the received command when the character size discriminated by said discriminating means is smaller than a predetermined size.

16. An apparatus according to claim 15, wherein said selecting means can selects the first processing method from any character pattern of a character pattern train to be output.

17. An output apparatus operable in a first processing method in which a character pattern of a bit map form can be selected and output or in a second processing method in which a character pattern can be made by arithmetic operating processes and output, said apparatus comprising:

receiving means for receiving a command from an exterior equipment to indicate that the first processing method is to be selected;

discriminating means for discriminating the size of a certain character in the case of outputting the character; and selecting means for selecting the second processing method irrespective of the received command when the character size discriminated by said discriminating means is larger than a predetermined size.

18. An apparatus according to claim 17, wherein said selecting means can select the second processing method from any character pattern of a character pattern train to be output.

19. An output apparatus operable in a first processing method in which a character pattern of a bit map form can be selected and output or in a second processing method in which a character pattern can be made by arithmetic operating processes and output, said apparatus comprising:

receiving means for receiving a command via a switch to indicate that the first processing method is to be selected;

discriminating means for discriminating the size of a certain character in the case of outputting the character; and selecting means for selecting the first processing method in response to the received command when the character size discriminated by said discriminating means is smaller than a predetermined size.

20. An apparatus according to claim 19, wherein said selecting means can select the first processing method from any character pattern of a character pattern train to be output.

21. An apparatus according to claim 33, wherein the switch may be manually operated.

22. An output apparatus operable in a first processing method in which a character pattern of a bit map form can be selected and output or in a second processing method in which a character pattern can be made by arithmetic operating processes and output, said apparatus comprising:

receiving means for receiving a command via a switch to indicate that the first processing method is to be selected;

discriminating means for discriminating the size of a certain character in the case of outputting the character; and selecting means for selecting the second processing method irrespective of the received command when the character size discriminated by said discriminating means is larger than a predetermined size.

23. An apparatus according to claim 22, wherein said selecting means can select the second processing method from any character pattern of a character pattern train to be output.

24. An apparatus according to claim 22, wherein the switch may be manually operated.

25. An output apparatus operable in a first processing method in which a character pattern of a bit map form can be selected and output or in a second processing method in which a character pattern can be made by arithmetic operating processes and output, said apparatus comprising:

receiving means for receiving a command from an exterior equipment and a command from a switch to indicate which one of the two processing methods is to be selected; and selecting means which can select either one of the two processing methods in accordance with the command received from either the exterior equipment or the switch, wherein the character pattern selected and output in the first processing method and the character pattern made and output in the second processing method represent the same pattern.

26. An apparatus according to claim 25, wherein said selecting means may select either one of the two processing methods from any character pattern of a character pattern train to be output.

27. An apparatus according to claim 1, 3, 5, 8, 11, 13, 15, 17, 19, 22 or 25, wherein the character pattern is output by a laser beam printer.

28. An apparatus according to claim 1, 3, 5, 8, 11, 13, 15, 17, 19, 22 or 25, wherein the character pattern is output by a CRT.

29. An apparatus according to claim 1, 3, 5, 8, 11, 13, 15, 17, 19, 22 or 25, wherein the character pattern is output by a page printer.

30. An apparatus according to claim 1, 3, 5, 8, 11, 13, 15, 17, 19, 22 or 25, wherein either one of the two processing methods is automatically set upon supply of power.

31. A method for operating in a first processing method in which a character pattern of a bit map form can be selected and output or in a second processing method in which a character pattern can be made by arithmetic operating processes and output, said method comprising the steps of:

receiving a command from an exterior equipment to indicate which one of the two processing methods is to be selected;

discriminating a memory capacity when outputting a certain character; and selecting either one of the two processing methods on the basis of the results of the discrimination irrespective of the received command, wherein the character pattern selected and output in the first processing method and the character pattern made and output in the second processing method represent the same pattern.

32. A method according to claim 31, wherein either one of the two processing methods are selected from any character pattern of a character pattern train to be output.

33. A method for operating in a first processing method in which a character pattern of a bit map form can be selected and output or in a second processing method in which a character pattern can be made by arithmetic operating processes and output, said method comprising the steps of:

receiving a command from an exterior equipment to indicate which one of the two processing methods is to be selected;

discriminating the size of a certain character when outputting the character; and selecting either one of the two processing methods on the basis of the results of the discrimination irrespective of the received command, wherein the character pattern selected and output in the first processing method and the character pattern made and output in the second processing method represent the same pattern.

34. A method according to claim 33, wherein either one of the two processing methods are selected from any character pattern of a character pattern train to be output.

35. A method for operating in a first processing method in which a character pattern of a bit map form can be selected and output or in a second processing method in which a character pattern can be made by arithmetic operating processes and output, said method comprising the steps of:

receiving a command from a switch to indicate which one of the two processing methods is to be selected;

discriminating a memory capacity when outputting a certain character; and selecting either one of the two processing methods on the basis of the results of the discrimination irrespective of the received command, wherein the character pattern selected and output in the first processing method and the character pattern made and output in the second processing method represent the same pattern.

36. An apparatus according to claim 35, wherein either one of the two processing methods are selected from any character pattern of a character pattern train to be output.

37. An apparatus according to claim 35, further comprising a step of manually operating the switch.

38. A method for operating in a first processing method in which a character pattern of a bit map form can be selected and output or in a second processing method in which a character pattern can be made by arithmetic operating processes and output, said method comprising the steps of:

receiving a command from a switch to indicate which one of the two processing methods is to be selected;

discriminating the size of a certain character when outputting the character; and selecting either one of the two processing methods on the basis of the results of the discrimination irrespective of the received command, wherein the character pattern selected and output in the first processing method and the character pattern made and output in the second processing method represent the same pattern.

39. An apparatus according to claim 38, wherein either one of the two processing methods are selected from any character pattern of a character pattern train to be output.

40. An apparatus according to claim 38, further comprising a step of manually operating the switch.

41. An output method for operating in a first processing method in which a character pattern of a bit map form can be selected and output or in a second processing method in which a character pattern can be made by arithmetic operating processes and output, said methods comprising the steps of:

discriminating a memory capacity when outputting a certain character; and selecting the second processing method when said discriminating step discriminates that the memory capacity is sufficient.

42. A method according to claim 41, wherein the second processing method can be selected from any character pattern of a character pattern train to be output.

43. An output method for operating in a first processing method in which a character pattern of a bit map form can be selected and output or in a second processing method in which a character pattern can be made by arithmetic operating processes and output, said methods comprising the steps of:

discriminating a memory capacity when outputting a certain character; and selecting the first processing method when said discriminating step discriminates that the memory capacity is insufficient.

44. A method according to claim 43, wherein the first processing method can be selected from any character pattern of a character pattern train to be output.

45. A method for operating in a first processing method in which a character pattern of a bit map form can be selected and output or in a second processing method in which a character pattern can be made by arithmetic operating processes and output, said method comprising the steps of:

receiving a command from an exterior equipment to indicate that the first processing method is to be selected;

discriminating the size of a certain character when outputting the character; and selecting the first processing method in response to the received command when the discriminated character size is smaller than a predetermined size.

46. A method according to claim 45, wherein the first processing method can be selected from any character pattern of a character pattern train to be output.

47. A method for operating in a first processing method in which a character pattern of a bit map form can be selected and output or in a second processing method in which a character pattern can be made by arithmetic operating processes and output, said method comprising the steps of:

receiving a command from an exterior equipment to indicate that the first processing method is to be selected;

discriminating the size of a certain character when outputting the character; and selecting the second processing method irrespective of the received command when the discriminated character size is larger than a predetermined size.

48. A method according to claim 47, wherein the second processing method can be selected from any character pattern of a character pattern train to be output.

49. A method for operating in a first processing method in which a character pattern of a bit map form can be selected and output or in a second processing method in which a character pattern can be made by arithmetic operating processes and output, said method comprising the steps of:

receiving a command from a switch to indicate that the first processing method is to be selected;

discriminating the size of a certain character when outputting the character; and selecting the first processing method in response to the received command when the discriminated character size is smaller than a predetermined size.

50. A method according to claim 49, wherein the first processing method can be selected from any character pattern of a character pattern train to be output.

51. An apparatus according to claim 49, further comprising a step of manually operating the switch.

52. A method for operating in a first processing method in which a character pattern of a bit map form can be selected and output or in a second processing method in which a character pattern can be made by arithmetic operating processes and output, said method comprising the steps of:

receiving a command from a switch to indicate that the first processing method is to be selected;

discriminating the size of a certain character when outputting the character; and selecting the second processing method irrespective of the received command when the discriminated character size is larger than a predetermined size.

53. A method according to claim 52, wherein the second processing method can be selected from any character pattern of a character pattern train to be output.

54. A method according to claim 52, further comprising the step of manually operating the switch.

55. An output method for operating in a first processing method in which a character pattern of a bit map form can be selected and output or in a second processing method in which a character pattern can be made by arithmetic operating processes and output, said method comprising the steps of:

receiving a command from an exterior equipment or a command from a switch to indicate which one of the two processing method is to be selected;

selecting either one of the two processing methods in accordance with the command received from either the exterior equipment or the switch, wherein the character pattern selected and output in the first processing method and the character pattern made and output in the second processing method represent the same pattern.

56. A method according to claim 55, wherein either one of the two processing methods can be selected from any character pattern of a character pattern train to be output.

57. A method according to claim 31, 33, 35, 38, 41, 44, 45, 47, 49, 52 or 55, wherein the character pattern is output by a laser beam printer.

58. A method according to claim 31, 33, 35, 38, 41, 44, 45, 47, 49, 52 or 55, wherein the character pattern is output by CRT.

59. A method according to claim 31, 33, 35, 38, 41, 44, 45, 47, 49, 52 or 55, wherein the character pattern is output by a page printer.

60. A method according to claim 31, 33, 35, 38, 41, 44, 45, 47, 49, 52 or 55, wherein either one of the two processing methods is automatically set upon supply of power.

* * * * *

UNITED STATES PATENT AND TRADEMARK OFFICE
CERTIFICATE OF CORRECTION

PATENT NO. : 5,293,477
DATED : March 8, 1994
INVENTOR(S) : TORU MATOBA

It is certified that error appears in the above-indentified patent and that said Letters Patent is hereby corrected as shown below:

TITLE PAGE, ITEM [56], REFERENCES CITED

U.S. Patent Documents,
"Hillendbrand et al." should read
--Hillenbrand et al.--.

COLUMN 2

Line 43, "patterns" should read --patterns entered--.
Line 44, "entered" should be deleted.

COLUMN 5

Line 57, "the" (first occurrence) should read --that--.
Line 59, "amde" should read --made--.
Line 64, "therefore," should read --Therefore,--.

COLUMN 6

Line 17, "size" should read --size is--.

COLUMN 8

Line 33, "operably" should read --operable--.

COLUMN 9

Line 47, "said" should be deleted.

UNITED STATES PATENT AND TRADEMARK OFFICE
CERTIFICATE OF CORRECTION

PATENT NO. : 5,293,477
DATED : March 8, 1994
INVENTOR(S) : TORU MATOBA

It is certified that error appears in the above-indentified patent and that said Letters Patent is hereby corrected as shown below:

COLUMN 10

Line 22, "selects" should read --select--.
Line 67, "claim 33," should read --claim 19,--.

COLUMN 12

Line 53, "An apparatus" should read --A method--.
Line 57, "An apparatus" should read --A method--.

COLUMN 13

Line 8, "An apparatus" should read --A method--.
Line 12, "An apparatus" should read --A method--.

COLUMN 14

Line 26, "An apparatus" should read --A method--.
Line 47, "the" (first occurrence) should read --a--.

Signed and Sealed this

Thirteenth Day of September, 1994

Attest:

BRUCE LEHMAN

Attesting Officer     Commissioner of Patents and Trademarks